UNITED STATES PATENT OFFICE.

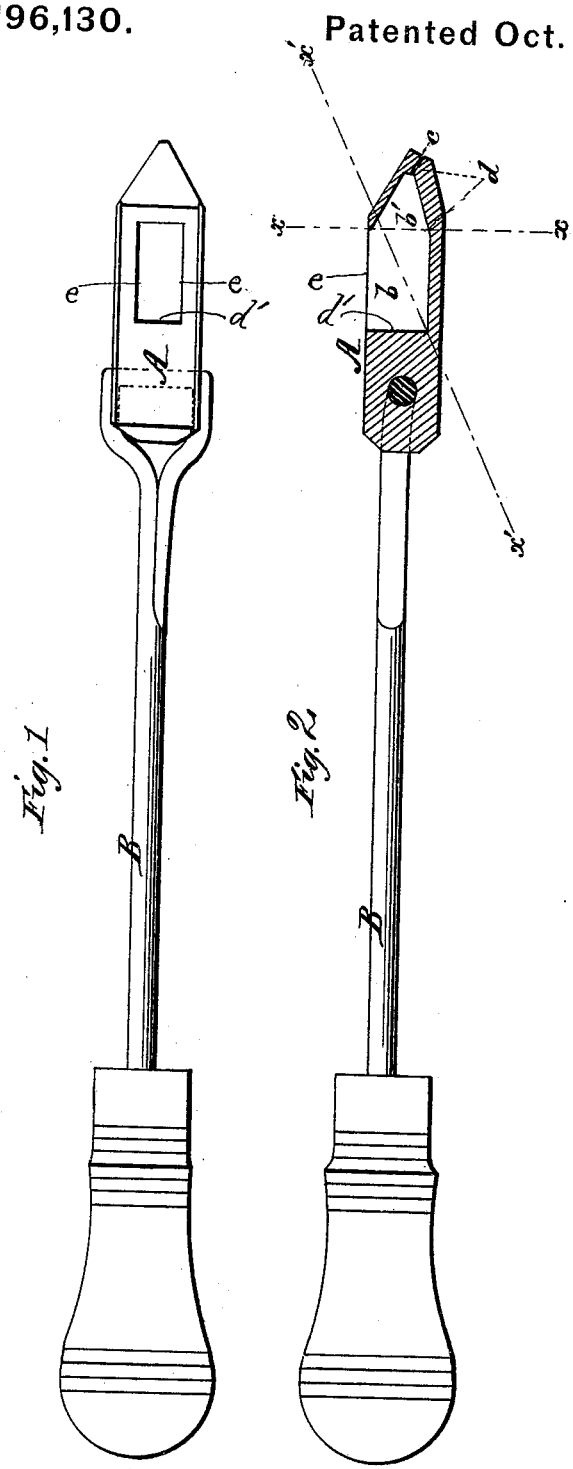

HENNELL STEVENS, OF BRAZORIA, TEXAS.

IMPROVEMENT IN SOLDERING-IRONS.

Specification forming part of Letters Patent No. 196,130, dated October 16, 1877; application filed March 21, 1877.

*To all whom it may concern:*

Be it known that I, HENNELL STEVENS, of Brazoria, in the county of Brazoria and State of Texas, have invented a new and Improved Soldering-Iron; and I do hereby declare that the following is a full, clear, and exact description of the same, reference being had to the accompanying drawings, making part of this specification, in which—

Figure 1 is a top view of the soldering-iron attached to its handle, and Fig. 2 a vertical longitudinal section of the same.

The soldering-iron in common use is made solid throughout, and in its manipulation the working-point of the iron, when heated and placed in contact with a plate of solder, will retain on its point a small portion only of the solder for use in the act of soldering. The patent granted H. J. Behrens, No. 20,975, shows a soldering-iron made hollow and in two parts, these parts being united either by a screw or a clamp, or by such other analogous fastening as will readily admit of the removal of the front portion for the purpose of introducing solder within the soldering-iron.

This plan is, however, too expensive in construction, and besides this, if any portion of the solder becomes cooled or "set" within its chamber, the two parts of such soldering-iron become soldered together, thus causing annoyance in again separating the parts for the introduction of solder. Besides this, a rod extends throughout the length of such implement, and through the orifice at its soldering point or end, which rod, becoming clogged with the burned refuse or waste matter of the solder, becomes at times inoperative, and clogs the soldering-orifice.

By my invention I overcome these objections, my soldering-iron being made of a single homogeneous piece of metal, with a chamber or recess having imperforate recess and side walls $e\ e$, being partly uncovered to contain the solder, which chamber connects with a capillary discharging tube or slot, through which the molten solder flows by reason of contact with the tin vessel while in the act of soldering. And at the same time, in forming this chamber, care is taken to have the front and bottom portion of the same formed with a view to the retention of the greatest amount of heat immediately at the exit-point of said tube or slot, in order to effect the ready flow of the solder.

A in the drawings indicates my soldering-iron, which is made hollow, as at $b\ b'$. The side and rear walls $e\ e\ d'$ of the chamber or pocket $b\ b'$ are imperforate or solid, and of one homogeneous piece of metal. B is the handle, secured to A, as indicated in the drawings. The pocket $b$ extends down from the upper side of the soldering-iron, as shown, and is uncovered, so that when the iron is heated one end of a bar of solder may be readily inserted therein, and such quantity thereof be melted within the pocket $b$ as will supply the pocket with molten solder sufficient to do a large amount of work. This pocket $b$, forward of the dotted line $x\ x$, is inclosed on all sides, as shown, so that when the implement, during its manipulation in the act of soldering, is so elevated that the surface of the molten solder will be on the dotted line $x'\ x'$, the metal will still be retained in the pocket, and not overflow the soldering-iron.

The hollow portion or pocket $b\ b'$ is connected with the soldering-point of the implement by a capillary tube or slot, $c$, made so small that when the iron is heated the solder will be retained by capillary attraction until the tool is applied to a tinned surface, or to the object to be soldered, and the same capillary attraction will cause the molten solder to flow in sufficient quantity, as required; and, in order to facilitate such flow, I provide for the retention of the greatest heat of the solder immediately at the bottom of the pocket which is nearest the orifice or slot $c$ by an increased mass of metal in the soldering-iron, as indicated at $d$.

I am aware that a patent was granted to J. W. Hollingsworth for a metal injector on May 17, 1870; but in this contrivance a hopper for conducting melted solder into a chamber below the top is provided on top of the iron, and a plunger is used for forcing the fluid solder out of the chamber. I do not claim the construction shown by Hollingsworth, nor by Behrens; but

What I claim as new, and desire to secure by Letters Patent, is—

1. The soldering-iron A, made of a single homogeneous piece of metal, having a chamber for the reception and retention of solder, as at $b\ b'$, said chamber being partly opened and partly covered, and with an increased heating portion of metal, as at $d$, near the capillary discharging-orifice $c$, substantially as and for the purpose described.

2. The hand soldering-iron A, having a plane-faced surface on top and a chamber, $b\ b'$, below, with imperforate rear and side walls $e\ e$ and $d'$, and communicating with a discharging-orifice, as at $c$, and having an opening into said chamber, through which, by a single act of charging such chamber, a piece of unmelted solder sufficient in size for one full charge of the chamber may be introduced, substantially as described.

Witness my hand, in the matter of my application for a patent for an improved soldering-iron, this 20th day of March, 1877.

HENNELL STEVENS.

Witnesses:
 JAMES MARTIN, Jr.,
 A. G. HEYLMUN.